United States Patent [19]

Fick et al.

[11] Patent Number: 4,626,344
[45] Date of Patent: Dec. 2, 1986

[54] OIL FILTER RESTRICTION SENSOR

[76] Inventors: Virginia L. Fick; Kenton W. Fick, both of 3007 S. Xenia Ct., Denver, Colo. 80231

[21] Appl. No.: 821,841

[22] Filed: Jan. 23, 1986

[51] Int. Cl.$^4$ .............................................. B01D 35/14
[52] U.S. Cl. ...................................... 210/90; 116/70; 210/149
[58] Field of Search ......... 210/90, 133, 149, DIG. 17; 116/70

[56] References Cited

U.S. PATENT DOCUMENTS

| | | | |
|---|---|---|---|
| 2,729,339 | 1/1956 | McCoy | 210/149 |
| 3,250,242 | 5/1966 | Pekarek | 210/90 |
| 3,270,884 | 9/1966 | Bremer | 210/90 |
| 3,429,291 | 2/1969 | Hoffman | 210/90 |
| 3,503,506 | 3/1970 | Kudlaty et al. | 210/90 |
| 4,006,083 | 2/1977 | Westervelt | 210/90 |
| 4,029,042 | 6/1977 | Juhasz | 210/90 |
| 4,116,156 | 9/1978 | Draxler | 210/90 |
| 4,168,237 | 9/1979 | Pickett et al. | 210/DIG. 17 |

FOREIGN PATENT DOCUMENTS

WO82/02498 8/1982 PCT Int'l Appl. .
1081443 8/1967 United Kingdom .

*Primary Examiner*—John Adee
*Attorney, Agent, or Firm*—Fields, Lewis, Pittenger & Rost

[57] ABSTRACT

An oil filter restriction sensor device for warning the operator of an internal combustion engine when the engine oil filter has become restricted and requires replacement comprising a sensor body and a threaded adapter for mounting the sensor body between the engine mounting bracket and an oil filter having a filter element. The sensor body has passageways which allow a normal flow pattern for the oil input and filtered oil output through the filter element. A spring biased slidable piston is mounted within the sensor body with incoming oil and filtered output oil pressure applied to opposite ends of the piston. When the oil filter differential pressure exceeds a predetermined amount the piston moves to a position grounding an electrical connector causing an alarm signal to be initiated warning the operator of the restricted filter condition.

12 Claims, 10 Drawing Figures

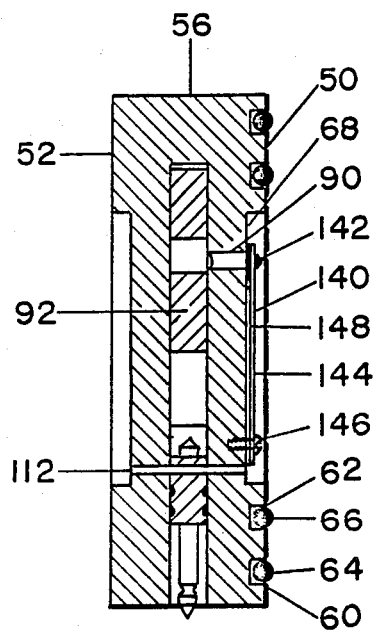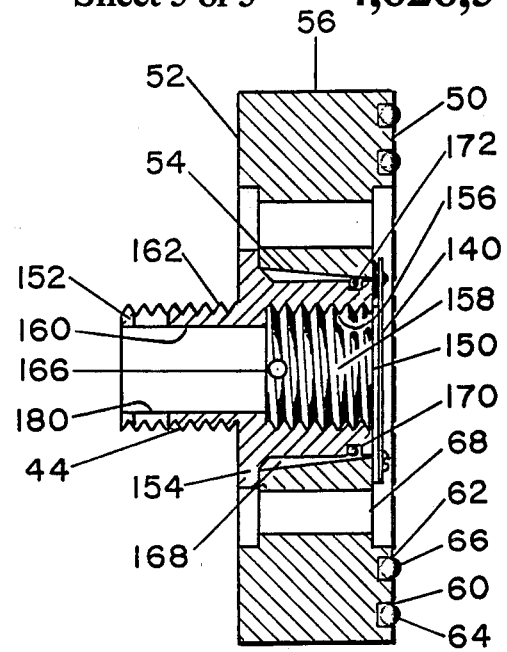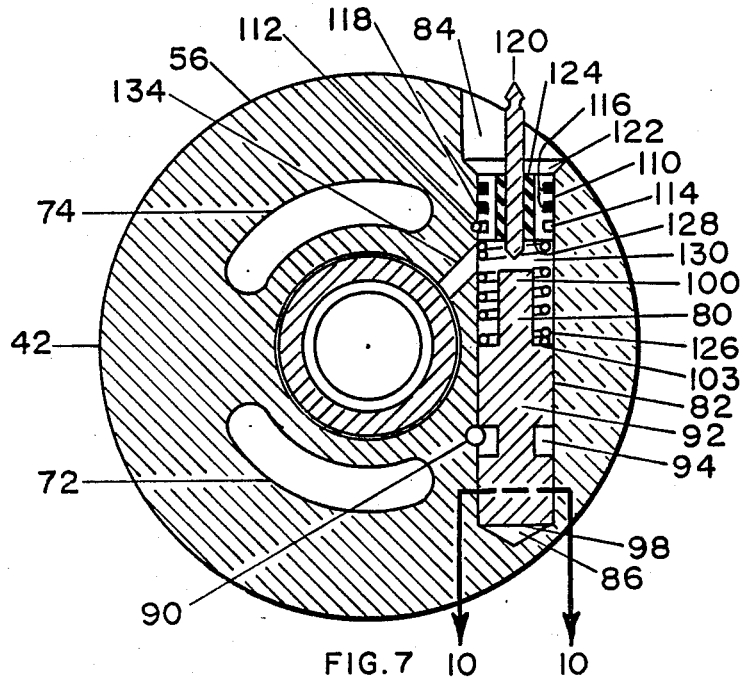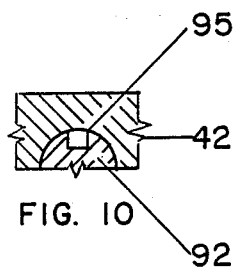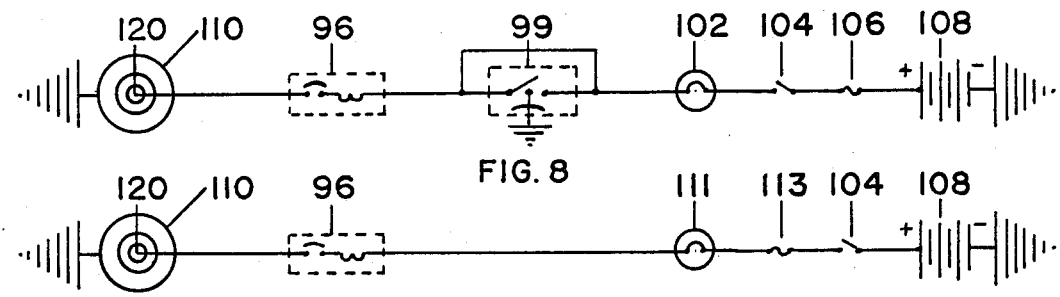

OIL FILTER RESTRICTION SENSOR

BACKGROUND OF THE INVENTION

During the past years there have been a number of signaling devices which have been provided for automobiles for the purpose of warning when various abnormal situations occur especially with the engine. One of these in particular deals with a light which indicates when the pressure in the engine lubricating oil system has dropped below a predetermined value. It is well known that if the oil pressure should drop below a specific level or is lost completely, the engine is in danger of being permanently damaged through lack of lubrication. By the same token it is highly important that the oil that is flowing through the engine be clean and free of contaminants to allow the engine to run properly so that the vehicle can be driven for many miles.

In order to maintain the oil in this relatively clean condition it is common to include an oil filter on the engine which has a spin-on or cartridge type filter element. The oil filter attaches to a permanently mounted bracket positioned on the side of the engine. The bracket is connected to an oil passage coming directly from the lubricating oil pump found in the pan of the engine and directs the oil in the proper channel through the filter element with the return flow going to the various bearings and critical parts within the engine.

The mounting bracket also generally contains a bypass valve so that if the oil is heavily contaminated and blocks the pores of the oil filter element causing the flow to be greatly restricted or reduced, the bypass valve will be forced to open allowing the incoming oil to bypass directly to the outlet and to the engine to prevent any complete blockage and thus, loss of lubrication.

The applicants are unaware of any device that is presently on the market to warn the operator of the vehicle when the oil filter element is no longer performing its intended function of filtering foreign material and contaminants from the lubricating oil.

The most common method used at present is to replace the oil filter at various time or mileage intervals as specified by the vehicle manufacturer. On engines that usually run clean the oil filter could still be operating efficiently when this interval is reached. And in very dirty engines or engines which are run in a very dusty climate, it is highly possible that the oil filter could be completely plugged or inoperative long before the interval is reached. Thus, if the filter becomes plugged or clogged, the contaminated lubricating oil which is bypassed contains abrasive materials that could cause rapid wear of the moving parts of the engine.

The present invention is designed to warn the operator before the oil filter becomes entirely inoperative causing the oil to bypass the filter. In most cases where the oil filter is still functioning properly when the recommended mileage or time interval is reached, the use can continue which will eliminate unnecessary replacement of the filter element and the additional oil required when the new oil filter element is installed.

INFORMATION DISCLOSURE STATEMENT

This statement is intended to comply with the applicants' acknowledged duty to inform the Patent Office of any pertinent information of which they are aware. The following information refers to the most pertinent patents of which the applicants have knowledge with respect to the subject matter of their present invention. Although other patents may be available which deal with this subject matter, they are believed to be less pertinent than the patents which are discussed herein.

The Bremer patent (U.S. Pat. No. 3,270,884) discloses a fluid filter system for aircraft hydraulic systems which utilize a dual element filter assembly. This system incorporates a mechanism within the filter assembly for by-passing portions or all of the filtering elements when they become blocked or plugged. Both of the filter elements have a mechanical clogged filter indicator which is actuated by increased pressure drop across the filter elements. The indicator is a pressure actuated plunger which is raised when the pressure differential across the filter exceeds a predetermined limit. This patent teaches that the indicator could be a light or sound mechanism to alert the operator that the elements have reached a predetermined clogged condition.

The Mason patent (U.S. Pat. No. 3,639,998) discloses a pressure responsive filter indicator which is disclosed for use in a clothes dryer. This filter indicator is responsive to changes in pressure drop across a filter positioned in the air exhaust passageway in the dryer. Once the predetermined pressure differential is reached, the diaphragm moves to an extended position wherein a light transmitting rod is extended which shows a colored surface indicating the clogged condition.

The Magondeaux patent (U.S. Pat. No. 3,969,,891) discloses a warning device for detecting the clogged condition of an air purifier filter for internal combustion engines. An internal flexible diaphragm senses a differential pressure across the filter element. An indicator is connected to the diaphragm and is caused to appear in a transparent portion of the sidewall of the device when the pressure differential exceeds a predetermined limit. This patent also states that the presence of a light or sound signal in a filter device of this nature is known.

The Westerfelt, et al. patent (U.S. Pat. No. 4,006,083) is disclosed as an apparatus for indicating the clogged condition of a fluid filter. The apparatus includes an electrical switch circuit which is actuated by a diaphragm type pressure differential switch. Pressure response across the diaphragm which is a Belleville washer type element snaps over causing the electrical contact to be made when the pressure reaches a predetermined level.

Draxler patent (U.S. Pat. No. 4,116,156) is merely a pressure sensitive device similar to the previous devices mentioned which provide an alarm actuator for a fluid filter. A floating piston mounted within the valve is caused to move against a spring loaded cylinder when the pressure differential across the filter exceeds a predetermined limit. Once the piston moves beyond a specified point pressurized fluid is allowed to escape through an outlet which is directed to a pressure sensitive switch causing an alarm to be given. The actual electrical switch and circuitry is not disclosed in this patent but is intended to be a separate entity.

As can be easily seen, none of these references directly read on or anticipate the applicant's invention which is described and claimed herein.

SUMMARY OF THE INVENTION

This invention is directed to an oil filter sensor for warning the operator of an internal combustion engine when the filter element has become restricted or clogged. This novel sensor can be installed on either new or existing engines merely by mounting the sensor device between the fluid filter and the normal mounting bracket or support for that filter.

The sensor, when activated by a restricted oil filter element, grounds an electrical circuit actuating a warning device which is visible or audible to the operator of the internal combustion engine and vehicle. The actual warning device which is actuated can be anything from a light, a horn or noise-making device or even a voice synthesizer to verbally warn the operator of the impending condition.

The oil filter sensing device consists of a disk-shaped body having parallel first and second opposite side surfaces. Two apertures extend completely through the body. These apertures are precisely located so that they coincide with a plurality of concentric rings interspersed with a number of concentric grooves provided on the first and second side surfaces. In addition, a centrally positioned bore or aperture extends coaxially through the sensor body and is provided with a threaded mounting adapter nipple which allows the body to be threaded mounted to the oil filter bracket provided on the engine as well as the mounting of the filter cartridge to the opposite side of the body. In this way, the sensor can be sandwiched between the bracket and filter to perform its desired function.

One or more O-ring seals are provided in the concentric grooves provided on one side of the body while a flat sealing surface is provided on the opposite side. Thus, the body is caused to provide a fluid seal between the engine bracket and between the filter to control the flow of lubricating oil through the body so that this fluid will flow normally through the bracket and through the filter during engine operation.

The sensor body also includes a closed cylindrical bore. One end of this bore is closed by an insertable sealed plug which is held in position by a roll pin or other suitable fastener. An electrically insulated contact or connector is arranged to extend through the plug and is provided with a flattened surface on the inside surface of the plug to be used as an electrical switch contact. Internally, within the bore is provided a calibrated spring-loaded piston. The piston is arranged to slidably move within the bore and to be positioned in a first or normal position spaced by the biasing spring to keep it away from the electrical contact. Internal passageways are provided by a pair of apertures which carry the incoming and outgoing clean lubricating oil streams. Thus, if the pressure differential builds up beyond what is considered to be a normal pressure differential between these two oil streams the piston will be forced to move against the biasing spring to contact the electrical connector. When the pressure differential across the filter is only marginal, the movement of the piston will be intermittent causing the warning light and the alarm device to be only actuated on an intermittent basis. As the restriction or clogging of the filter progresses, the shuttle will move more frequently producing a varying signal which will better indicate the actual condition of the filter to the operator.

On the upstream side of the sensor body in a passageway which communicates with incoming unfiltered oil, a temperature sensitive device or valve is provided to prevent false alarms by the sensor device. The thermostatically controlled arm of the valve has a seat extending into the incoming oil passageway which prevents cold oil having a higher than normal pressure from moving the piston until the engine oil is heated and the oil pressure returns to normal preventing indication of a false alarm by the sensor. Thus, the piston is held in the normal operating position to prevent electrical contact until such time as the heated lower viscosity oil is present in the system which will provide an accurate indication of the pressure differential across the filter.

BRIEF DESCRIPTION OF THE DRAWINGS

Other features of this invention will appear in the following description and appended claims reference being made to the accompanying drawings forming a part of the specification where like reference characters designate corresponding parts in the views.

FIG. 5 is a cross-sectional view taken along lines 5—5 of FIG. 2 showing a temperature sensitive control valve for preventing false alarms;

FIG. 6 is a cross-sectional view taken along lines 6—6 of FIG. 2 showing the position of the threaded mounting adapter in the installed position;

FIG. 7 is a cross-sectional view taken along lines 7—7 of FIG. 3 which shows the positioning of the spring-biased piston in the normal position;

FIG. 8 is a wiring schematic showing the installation of the oil restriction sensor device connected to the normal oil pressure warning light circuit provided within the vehicle;

FIG. 9 is a wiring schematic showing the oil restriction sensor device connected to a separate light alarm circuit additionally provided within the vehicle; and FIG. 10 is a cross-sectional view taken along lines 10—10 of FIG. 7 which shows an internal passageway which allows incoming oil pressure to be applied against the end of the piston causing the piston to move against the biasing spring.

DETAILED DESCRIPTION OF THE INVENTION

Figure 1:
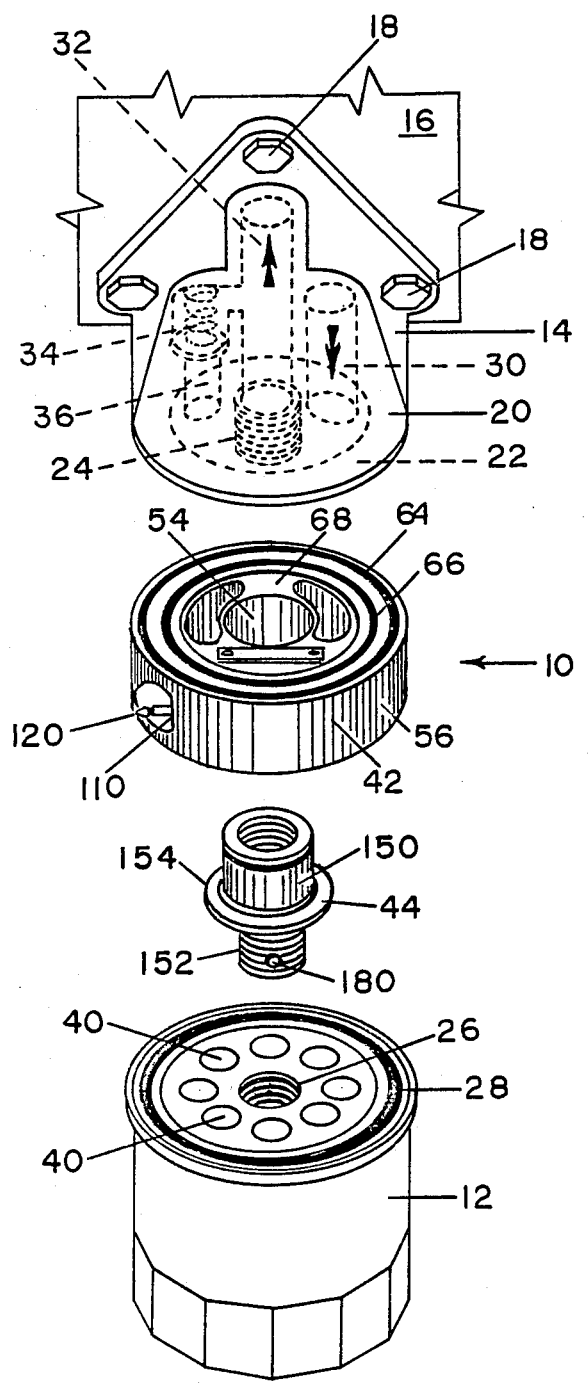
FIG. 1 is an exploded isometric view of the sensor device according to the present invention shown positioned between the oil filter and its engine mounting bracket.
Figure 2:
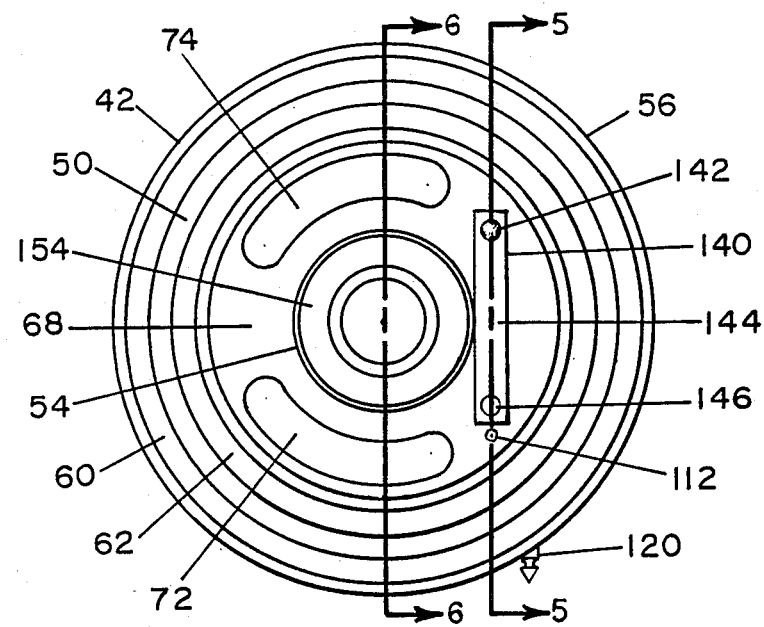
FIG. 2 is a top plan view of the oil filter restriction sensor showing concentric grooves on one side of the sensor body.
Figure 3:
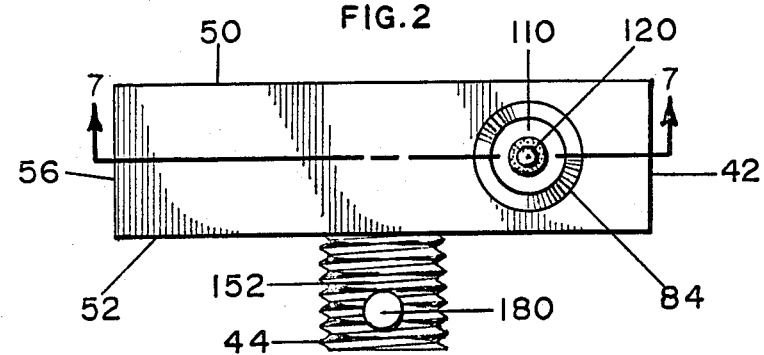
FIG. 3 is a side view of the sensor device wherein the oil filter mounting nipple is positioned in a downward direction.
Figure 4:
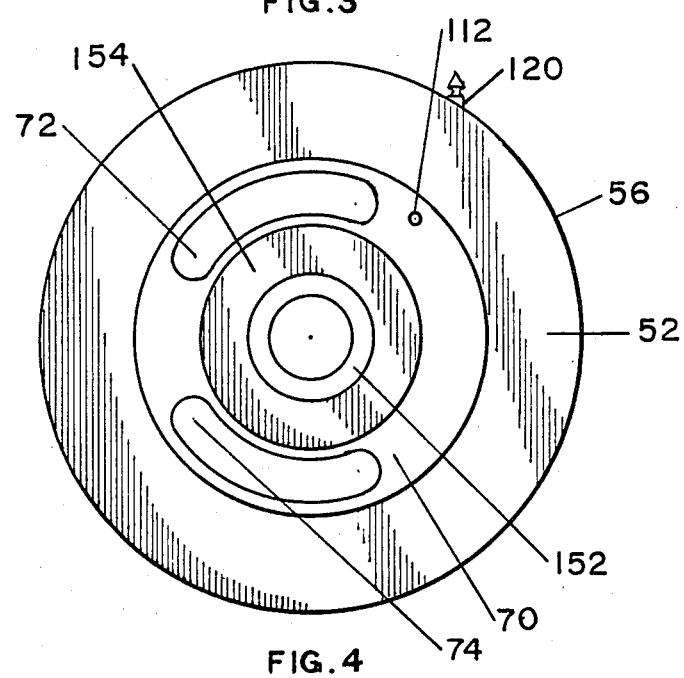
FIG. 4 is a bottom plan view of the oil filter restriction sensor device showing the smooth oil filter sealing surface.

Turning now more specifically to the drawings, FIG. 1 shows an exploded view positioning the oil filter restriction sensor device 10 according to the present invention between a spin-on type oil filter 12 and the normal oil filter mounting bracket 14. The oil filter mounting bracket 14 is, as is well known in the art, mounted directly to the engine block 16 by suitable fasteners such as bolts 18. The oil filter mounting bracket 14 usually incorporates an outwardly extending housing 20 having a flat sealing surface 22 and threaded mounting nipple 24 for attaching the filter 12 in a leak-tight sealed manner. The filter 12 has a central threaded opening 26 and a circumferential sealing gasket 8 mounted at the upper edge of the filter cartridge. In normal use the filter is mounted to the engine bracket by threading the nipple 24 into the central aperture 26 in the filter cartridge. The filter gasket 28 provides a complete seal against the surface 22 on the bracket to prevent any leakage or loss of oil. An oil supply passageway 30 and oil return passageway 32 are provided within the bracket and are properly connected to the oil lubrication system within the internal combustion engine.

The engine mounting bracket also includes a bypass relief valve 34 which is mounted in an additional passageway 36 in the bracket which allows the oil supply to bypass the oil filter cartridge permitting the oil to return to the engine without being blocked if the cartridge becomes clogged and produces a pressure differential which is greater than the setting of the bypass valve. This is a safety feature which prevents the supply of lubricating oil from being stopped which would cause the engine to be rapidly damaged. The oil entering the bracket through the supply passageway 30 enters the area on top of the oil filter cartridge and passes downwardly onto one side of the oil filter element through the apertures 40. The oil after passing through the filter element returns to the engine through the central opening 26 and adapter central return passageway 32.

The present invention provides a unique restriction sensor and warning device 10 which can be either in a kit form or adapter form which can be easily installed between the oil filter cartridge 12 and its mounting bracket 20. The sensor device 10 includes body 42 and threaded mounting adapter insert 44. The disk-shaped body 42 consists of upper or first substantially flat side surface 50 and lower or second side surface 52. A smooth tapered central bore 54 extends coaxially through the body 42. The outer circumferential surface 56 of the body 42 is generally circular but can actually have any outer configuration desired such as octagonal or square with a double taper, grooved or knurled surface finish.

The upper or first surface 50 of the body 42 has one or more circumferential grooves 60 and 62 which are sized and arranged continuously to provide a receptacle for suitable O-ring type seals 64, 66 as shown in FIG. 1. Although the outer diameter of the body 42 can be varied as required, it is anticipated that the body overall size will be standardized on one or two outside diameters which will fit most engine oil filter mounting brackets. The actual diameters of the grooves for the O-ring seals will be sized to fit the majority of the mounting brackets anticipated. It is also to be understood that only one groove could be provided which will have a compromise size to fit the majority of the brackets available.

The surface 68 on the upper surface 50 surrounding the central bore 54 is recessed by approximately ⅛th to 3/16ths of an inch. A similar recessed surface 70 is also provided on the second or bottom surface 52 and is coaxially positioned around the tapered aperture 54. A plurality of curved longitudinal slots 72, 74 are arranged to follow the outside curvature of the recesses 68, 70 and are provided to interconnect the recessed surfaces 68, 70 to provide a passageway for the incoming unfiltered oil to pass through the device and allow communication between the incoming oil passageway 30 in the mounting bracket and the openings 40 provided in the oil filter cartridge. In this way the unfiltered oil passes directly from the bracket through the sensor device and into the filter cartridge.

A pressure sensitive alarm switch 80 is mounted within a circular bore 82 formed within the body 42 which communicates at one end with an opening 84 passing through the side of the body. The opposite end 86 of the bore 82 is closed.

An aperture 90 extends from the surface 68 into the bore 82. A cylindrical piston or shuttle 92 is arranged to slidably move within the bore 82. The diameter of the piston 92 is sized to be slightly smaller than the inside diameter of the bore 82 to allow the piston 92 to freely slide within the bore but prevent any rapid flow of oil between the closed end 86 and the opposite end of the bore 82. A circumferential groove 94 is provided around the outer surface of the piston 92 with a longitudinal groove 95 provided to allow oil to flow through the aperture 90 and groove 95 to the blind end 98 of the piston 92. The opposite end 100 of the piston 92 is reduced in size a sufficient amount to provide a shoulder 103.

A removable plug 110 having a suitable diameter to fit snugly within the bore 82 is positioned at the opening 84. A fastening means such as a roll pin 112 is inserted in a bore passing through the body 42 and is arranged to engage a retaining groove 114 provided in the surface of the plug 110. A number of circumferential sealing grooves 116 and O-ring seals 118 are also provided in the outer surface of the plug to prevent any leakage of oil from the bore 82. A pin type contact or connector 120 is positioned within a central bore 122 provided within the plug 110 with the pin 120 insulated from the plug 110 by a suitable dielectric insulation material 124.

A spring 126 having a linear compression force is positioned between the inner surface of the plug 110 and the shoulder 103 of the piston 92. The pin 120 extends inwardly slightly beyond the inner surface 128 of the plug 110. The outer end of the pin 120 can be undercut to form a connector for an electrical wire receptacle. The spring 126, which can be of the helical or coil type, biases the piston 92 away from the inner end of the plug 110 and pin 120 to prevent contact between the piston 92 and the pin 120 when the sensor device is in normal operation.

A cavity 130 is provided between the piston 92 and the rear surface 128 of the plug 110 and this cavity 130 is connected to the tapered central bore 54 by an interconnecting drilled passageway 134.

An additional safety device 140 is provided to prevent false alarm signals to be given to the operator. The device 140 includes a valve seat 142 which is mounted on a bimetallic strip 144. The strip 144 is mounted to the surface 68 by means of a suitable fastener such as a threaded screw 146. The strip 144 can be formed from a temperature sensitive dual or bimetallic material or can include a temperature sensitive second strip 148 which can be provided below the upper strip 144. The valve seat 142 is positioned to close the passageway 90 to prevent incoming oil from flowing through the passageway 90 when the strip 144 is in the position shown in FIG. 5. When the oil in contact with the strip 144 has a low temperature the strip will remain in an extended, straight position. Once the oil reaches proper operating temperature or at least above 100° F. the strips 144 and/or 148 will be subjected to the higher temperature which will cause the strips to curve outwardly to the right as shown in FIG. 5 causing the valve seat 142 to move away from the opening of passageway 90. Thus, warm oil is allowed to pass through the passageway 90 into the bore 82. This operation will be explained in more detail later.

A threaded mounting adapter 44 is provided in conjunction with the sensor device 42. The adapter 44 has a cyclindrical end 150 and a threaded end 152. An outwardly extending circumferential flange 154 is positioned between the end 152 and 150. The outer diameter of the flange 154 is sized to overlap at least a portion of the recessed surface 70. An inner bore 156 having internal threads 158 is provided on the inside surface of the end 150. Bores 156 and 160 are coaxial and provide a continuous opening through the mounting adapter 44. The threaded sections 158 and 152 have the same thread pitch diameter and are intended to match the threads provided on the nipple 24 provided on the filter mounting adapter 14 as well as the threads provided in the central opening 26 of the filter cartridge 12. A small passageway 166 is provided through the end 150 to interconnect the bore 156 with the cavity 168 formed between the tapered central bore 54 in the body 42 of the device 10 and the outside surface of the adapter end 150. A circumferential groove 170 and suitable O-ring type seal 172 is provided in the outside surface of the end 150 to provide an oil seal to prevent bypassing of the incoming oil with the return oil. The outer threaded end 152 of the adapter 44 includes a diametrically aligned aperture 180 which is provided for the insertion of a tool for tightening the mounting adapter 44 onto the nipple 24 provided in the mounting bracket 14 during installation of the sensor device. The length of the end 150 between its outer edge and the associated surface of the shoulder 154 is less than the thickness of the body between the recessed surfaces 68 and 70.

Operation

The novel sensor device 10 which is provided can be used either on new vehicles or can be used to retrofit existing vehicles. To install the sensor device according to the present invention, it is merely necessary to remove the spin-on or cartridge type oil filter 12 from the oil filter mounting bracket 14. The sensor device including body 42 and threaded mounting adapter 44 are prepared by inserting the end of the mounting adapter 44 having the O-ring seal around its outer perimeter into the tapered aperture 54 of the body 42. Naturally, the end of the adapter is started through the end of the aperture having the greatest diameter so that the taper will provide an increasingly tighter seal against the O-ring as the adapter is inserted. The body 42 and adapter 44 are then mounted on the threaded nipple 24 of the bracket 14 by rotating the adapter 44 usually by inserting an elongated rod or tool into the aligned apertures 180 in the threaded end 152 of the adapter. The internal threads 158 on the adapter mate with the nipple 24 and as the adapter is rotated the O-ring seals 64 and/or 66 are positioned against the flat surface 22 on the mounting bracket 14 to provide a leak-tight oil seal. Once the adapter and sensor body are mounted on the engine bracket the oil filter cartridge 12 is mounted on the threaded end 152 of the adapter. The ring type seal 28 on the filter cartridge in turn seals against the flat bottom or second surface 52 of the body 42. Thus, a sealed unit is provided to prevent leakage of the lubricating oil from the engine system.

With the sensor device as provided in the present invention sandwiched between the oil filter cartridge and the mounting bracket, the lubricating oil system essentially operates in the same manner as previously described. Oil enters through the mounting bracket passageway 30, passes downwardly through the slots 72, 74 in the body 42 of the sensor and through the apertures 40 provided in the casing of the oil filter cartridge. Once the oil is passed through the filter media within the cartridge 12 it passes upwardly through the central opening 26 in the cartridge, the central passageway through the threaded mounting adapter 44, returning to the engine through the passageway 32 in the engine mounting bracket.

So long as the engine oil is either cold or below the normal operating temperature, the sensing device provided in the present invention does not function. In this way the higher viscosity and, thus, higher pressure of the colder oil will not adversely effect the operation of the sensor which in turn would signal false alarms to the operator.

Once the oil reaches proper temperature the strip or strips 144, 148 because of the elevated temperature bend outwardly moving the seat 142 away from the opening 90. Once the passageway 90 is opened to the incoming oil flow, the oil passes downwardly into the cavity at the end of the shuttle or piston 92. At the same time the return oil passes through the aperture 166 in the mounting adapter 44 and passageway 134 which allows the return oil pressure to be sensed in the cavity 130 provided within the bore 82. The biasing force of the spring 126 and the projected area of the piston 92 is prearranged to allow the piston 92 to only move when the differential pressure between the incoming oil and the return oil exceeds a predetermined amount or range such as 4–5 psi. If the filter cartridge becomes clogged or blocked increasing the pressure differential between the incoming oil and the return oil to a point where it exceeds the predetermined setpoint of the sensor valve 80 the piston 92 will be caused to move towards the pin 120 and make contact. Usually the differential pressure set point for the sensor device will be set 1 or 2 psi lower than the setting for the bypass valve in the engine lubricating system.

The warning system on vehicles with oil pressure warning lights is illustrated in FIG. 8. The existing circuitry within the vehicle includes the oil pressure sending switch 99, warning light 102, key switch 104, fuse 106 and battery 108. The sensor switch 80 according to the present invention when installed on the engine would have a conductor connected between the pin 120 with an in-line flasher 96 and the output connection of the oil pressure sending switch 98. In this circuitry, the oil filter restriction sensor device would utilize the vehicle's existing warning light 102, key switch 104, fuse 106 and battery 108. The oil filter pressure switch would still function in its normal manner.

If the oil filter cartridge is restricted and the pressure differential across the filter exceeds the predetermined value, the contact made between the piston 92 and the end of the pin 120 causes the pin to be grounded causing the current to flow through the flasher and intermittently energize the warning light 102. A sticker or placard can be positioned adjacent to the warning light on the instrument panel of the vehicle to advise the operator that a flashing light indicates a restricted or partially restricted oil filter.

On vehicles without a factory installed oil warning light as illustrated in FIG. 9, a warning light 111 and fuse 113 must be added. This warning light would be installed so that it would be visible to the operator during use of the vehicle. The flasher 96 would be optional in this case and the warning light would be labeled "Oil Filter Restriction".

It is to be understood that other warning devices could be used in place of the warning light described above. Such other warning devices such as an audible noise device or voice synthesizer could be used to warn the operator of the restricted condition. On engines provided on new vehicles, the sensor device according to the present invention could be made a part of the engine lubricating oil system. The slide sensing valve could be incorporated into the oil filter mounting adapter or the engine block itself.

In addition it is to be understood that while reference has been made throughout this application to oil filters in general, the sensor device according to this invention can be used with any type of oil filter. This could include the spin-on type as well as the replaceable cartridge type of filter. Although additional fittings and hoses may be required to accommodate other filter types these are to be considered part of the present invention.

While a spin-on type oil filter restriction sensor device has been shown and described in detail in this application, it is to be understood that this invention is not to be considered to be limited to the exact form disclosed and changes in the detail and construction of the sensor device may be made without departing from the spirit thereof.

What is claimed is:

1. An oil filter sensor device for insertion between the oil filter mounting bracket mounted on an internal combustion engine and an oil filter cartridge having a filter element therein, said sensor device providing a warning to an operator of said engine if a restricted oil filter condition occurs, said sensor device includes:
   a. a disk-shaped body means having a first generally flat surface and an opposite second generally flat surface;
   b. said body means having a first longitudinal passageway centrally positioned through said body means to carry filtered oil between the oil filter element and said engine bracket interconnecting through said first and second surfaces and a second longitudinal passageway separately formed in said body means to carry incoming unfiltered oil between said engine bracket and said oil filter cartridge and arranged to interconnect through said first and second surfaces;
   c. a closed internal cyclindrical bore formed in said body means having a first end opening through the outer surface of said body means, a slidable piston mounted within said cylindrical bore and sized to closely fit the diameter of said bore, a removable plug suitably mounted within the open end of said bore to close and seal the bore and to restrict the movement of said piston;
   d. a biasing means positioned within said bore between said plug and said piston to bias the piston in a first position away from said plug, said plug having an insulated electrical connector mounted therein which extends into said bore so that the piston when it moves to a second position against said biasing means makes electrical contact with said connector;
   e. a first internal passageway provided within said body means to interconnect said first longitudinal passageway with the bore nearest the plug and a second internal passageway within said body means interconnecting said second longitudinal passageway with the opposite end of said bore whereby the differential pressure across the oil filter will also be applied across said slidable piston so that when the differential pressure across the filter exceeds a predetermined amount indicating a restricted filter element the piston will be caused to slide to the second position in contact with said electrical connector;
   f. said electrical connector being connected to a suitable alarm circuit means for alerting the operator to the restricted oil filter condition; and
   g. a threaded mounting adapter arranged to be inserted through said first longitudinal passageway in said body means and threaded to said oil filter mounting bracket and the oil filter cartridge mounted on the opposite side of said body means.

2. An oil filter sensor device as defined in claim 1 wherein said body means first flat surface includes a circumferential compression oil seal to seal against the oil filter mounting bracket and said body means second flat surface allows the seal on the oil filter cartridge to seal against said body means so as to provide a sealed condition to prevent loss of lubricating oil from the engine.

3. An oil filter sensor device as defined in claim 1 wherein the closed internal cylindrical bore is positioned on a chord line through the body means and parallel to and between said first and second flat body surfaces.

4. An oil filter sensor device as defined in claim 1 wherein said removable plug means includes sealing means provided around its circumferential surface for sealing said plug means in the bore to prevent leakage of lubricating oil from said bore.

5. An oil filter sensor device as defined in claim 1 wherein said insulated electrical connector formed in said plug means is an electrical connector pin extending beyond both ends of said plug means and includes means for electrically connecting said pin to a suitable alarm circuit means.

6. An oil filter sensor device as defined in claim 1 wherein the central surface area of said first and second body surfaces is recessed below said respective surfaces to provide a path for lubricating oil to flow from said oil filter and mounting bracket to the proper longitudinal first and second oil passageway, and said threaded mounting adapter is positioned in said first longitudinal passageway to channel said filtered oil flow and prevent this flow from bypassing back to the incoming unfiltered oil passageway.

7. An oil filter sensor device as defined in claim 1 wherein said second internal passageway in said body means includes a temperature sensitive valve which is responsive to the temperature of said incoming unfiltered lubricating oil to prevent abnormal pressures from being applied to said piston when the oil is of a cold and abnormally high pressure temperature to prevent false alarm signals.

8. An oil filter sensor device as defined in claim 7 wherein said temperature sensitive valve includes a bimetallic strip removably mounted at one end to said body means and with a valve seat sized to fit said second internal passageway mounted at the opposite end of said strip.

9. An oil filter sensor device as defined in claim 8 wherein said bimetallic strip is arranged so that the valve seat closes the second internal passageway when the strip is in a first straight condition and bends to a second position spacing the seat from the passageway when the oil exceeds a predetermined temperature.

10. An oil filter sensor device as defined in claim 1 wherein said threaded mounting adapter has a first end having an internal thread sized to fit a threaded mounting nipple provided on the oil filter mounting bracket and the opposite end of said adapter has an external threaded surface which is sized to correspond to the threaded central opening on the oil filter cartridge mounted on the opposite side of said body means.

11. An oil filter sensor device as defined in claim 10 wherein said threaded mounting adapter includes an outwardly extending circumferential flange separating said first and second ends and arranged to fit against the recessed surface of said second flat surface of said body means whereby the body means will be held securely against said oil filter mounting bracket when the first threaded end is engaged with the threaded nipple of said mounting bracket.

12. An oil filter sensor device as defined in claim 1 wherein said biasing means is a helical spring positioned within said bore and arranged to have a consistant compressive force during the lineal compression of the said spring thereby allowing the piston to slidably move when the predetermined pressure differential is exceeded.

* * * * *